US011837164B2

(12) United States Patent
Zhu et al.

(10) Patent No.: US 11,837,164 B2
(45) Date of Patent: Dec. 5, 2023

(54) DRIVE CONTROL CIRCUIT AND RELATED DRIVING METHOD THEREOF, AND DISPLAY PANEL

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Lixin Zhu, Beijing (CN); Hongli Yue, Beijing (CN); Chunyang Nie, Beijing (CN); Shenghua Hu, Beijing (CN); Ke Dai, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 576 days.

(21) Appl. No.: 16/966,280

(22) PCT Filed: Sep. 17, 2019

(86) PCT No.: PCT/CN2019/106236
§ 371 (c)(1),
(2) Date: Jul. 30, 2020

(87) PCT Pub. No.: WO2021/051280
PCT Pub. Date: Mar. 25, 2021

(65) Prior Publication Data
US 2022/0383812 A1 Dec. 1, 2022

(51) Int. Cl.
*G09G 3/3233* (2016.01)

(52) U.S. Cl.
CPC ... *G09G 3/3233* (2013.01); *G09G 2300/0426* (2013.01); *G09G 2300/0852* (2013.01);
(Continued)

(58) Field of Classification Search
CPC ............... G09G 3/00; G09G 3/3233; G09G 2300/0426; G09G 2300/0852; G09G 2310/0291; G09G 2310/0294; H02H 3/08
See application file for complete search history.

(56) References Cited

U.S. PATENT DOCUMENTS

2003/0006713 A1   1/2003   Kim et al.
2020/0219442 A1   7/2020   Zhu et al.

FOREIGN PATENT DOCUMENTS

CN   1402215 A   3/2003
CN   1901019 A   1/2007
(Continued)

OTHER PUBLICATIONS

International Search Report and Written Opinion dated May 28, 2020 for International Application No. PCT/CN2019/106236, 15 pages.

*Primary Examiner* — Stacy Khoo
(74) *Attorney, Agent, or Firm* — Dave Law Group LLC; Raj S. Dave (57) ABSTRACT

A drive control circuit is disclosed, and the drive control circuit is connected in series between a driving circuit and a first voltage terminal and forms a loop together. The drive control circuit comprises a current adjustment circuit and a control circuit. The current adjustment circuit controls a current in the loop according to a voltage signal difference between a voltage signal of a second node and a voltage signal of a first node. The control circuit controls the voltage signal of the second node according to the voltage signal of the first node, so that the current adjustment circuit controls the current in the loop during a start-up phase of the driving circuit.

18 Claims, 4 Drawing Sheets

(52) U.S. Cl.
CPC ............... *G09G 2310/0291* (2013.01); *G09G 2310/0294* (2013.01)

(56) References Cited

FOREIGN PATENT DOCUMENTS

| | | |
|---|---|---|
| CN | 105246207 A | 1/2016 |
| CN | 108682376 A | 10/2018 |
| CN | 109584775 A | 4/2019 |
| CN | 109639280 A | 4/2019 |
| JP | 2008-124284 A | 5/2008 |
| JP | 2015-130610 A | 7/2015 |
| KR | 20110034875 A | 4/2011 |
| WO | WO-2019033863 A1 * 2/2019 ................ G01J 1/42 |

* cited by examiner

DRIVE CONTROL CIRCUIT AND RELATED DRIVING METHOD THEREOF, AND DISPLAY PANEL

CROSS-REFERENCE TO RELATED APPLICATIONS

This application is the U.S. National Stage Entry of PCT/CN2019/106236, filed on Sep. 17, 2019, the entire disclosure of which is incorporated herein by reference as part of the disclosure of this application.

TECHNICAL FIELD

The present disclosure relates to the field of display technology, and particularly to a drive control circuit and a driving method thereof and a display panel.

BACKGROUND

A display panel generally includes a light emitting device and a driving circuit, for example, a data driving circuit, a scanning driving circuit, and the like. Specifically, the data driving circuit may provide the light-emitting device with an image data signal (also referred to as a column driving signal), and the scan driving circuit may provide the light-emitting device with a scan driving signal (also referred to as a row driving signal). With the development of technology, it is becoming a trend to increase the size and resolution of a display panel (that is, increase the total amount and density of light emitting devices in rows and columns).

SUMMARY

Embodiments of the present disclosure provide a drive control circuit and a driving method for the drive control circuit and a display panel.

A first aspect of the present disclosure provides a drive control circuit. The drive control circuit is connected in series between a driving circuit and a first voltage terminal and forms a loop together. The drive control circuit comprises a current adjustment circuit and a control circuit. Specifically, the current adjustment circuit is coupled to the driving circuit, a first node, and a second node, and is configured to control a current in the loop according to a voltage signal difference between a voltage signal of the second node and a voltage signal of the first node. The control circuit is coupled to the second node, the first voltage terminal, a second voltage terminal, a third voltage terminal, a control signal terminal, and the first node, and is configured to control the voltage signal of the second node according to the voltage signal of the first node, so that the current adjustment circuit controls the current in the loop during a start-up phase of the driving circuit.

In an embodiment of the present disclosure, the current adjustment circuit may comprise a first transistor. Specifically, a control electrode of the first transistor may be coupled to the second node, a first electrode of the first transistor may be coupled to the driving circuit, and a second electrode of the first transistor may be coupled to the first node.

In an embodiment of the present disclosure, the current adjustment circuit may further comprise a first resistor, a first diode, and a second resistor. Specifically, the first resistor may be coupled between the second node and the first transistor. Further, a first terminal of the first resistor may be coupled to the second node, and a second terminal of the first resistor may be coupled to the control electrode of the first transistor. A first electrode of the first diode and a first terminal of the second resistor may be coupled in parallel to the control electrode of the first transistor, and a second electrode of the first diode and a second terminal of the second resistor may be coupled in parallel to the first node.

In an embodiment of the present disclosure, the control circuit may comprise a sampling circuit and an amplifying circuit. Specifically, the sampling circuit may be coupled between the first node and the first voltage terminal, and may be configured to generate a sampling voltage signal at the first node according to the current in the loop. The amplifying circuit may be coupled to the first node, the first voltage terminal, the third voltage terminal, and the second node, and may be configured to amplify the voltage signal of the first node to generate an amplified voltage signal, and provide the amplified voltage signal to the second node.

In an embodiment of the present disclosure, the sampling circuit may comprise a third resistor and a fourth resistor. Further, a first terminal of the third resistor and a first terminal of the fourth resistor may be coupled in parallel to the first node, and a second terminal of the third resistor and a second terminal of the fourth resistor may be coupled in parallel to the first voltage terminal.

In an embodiment of the present disclosure, the amplifying circuit may further comprise a first amplifying circuit, a second amplifying circuit, and a first isolation circuit. Specifically, the first amplifying circuit may be coupled to the first node, the first voltage terminal, and a third node, and may be configured to amplify the voltage signal of the first node to generate a first amplified voltage signal, and provide the first amplified voltage signal to the third node. The second amplifying circuit may be coupled to the first voltage terminal, the third voltage terminal, the third node, and a fifth node, and may be configured to amplify the first amplified voltage signal into the second amplified voltage signal, and provide the second amplified voltage signal to the fifth node. The first isolation circuit may be coupled between the fifth node and the second node, and may be configured to provide the second amplified voltage signal as the amplified voltage signal to the second node, and prevent the voltage signal of the second node from being provided to the fifth node.

In an embodiment of the present disclosure, the first amplifying circuit may be a differential amplifying circuit, and the second amplifying circuit may be an integral amplifying circuit.

In an embodiment of the present disclosure, the first amplifying circuit may comprise a first amplifier, a fifth resistor, and a sixth resistor. Specifically, an output terminal of the first amplifier may be coupled to the third node, an in-phase terminal of the first amplifier may be coupled to the first node, and an out-phase terminal of the first amplifier may be coupled to a fourth node. A first terminal of the fifth resistor may be coupled to the fourth node, and a second terminal of the fifth resistor may be coupled to the first voltage terminal. A first terminal of the sixth resistor may be coupled to the third node, and the second terminal of the sixth resistor may be coupled to a fourth node. The second amplifying circuit may comprise a second amplifier, a seventh resistor, an eighth resistor, a first capacitor, a ninth resistor, a tenth resistor, an eleventh resistor, and a twelfth resistor. Specifically, an output terminal of the second amplifier may be coupled to the fifth node, an out-phase terminal of the second amplifier may be coupled to the sixth node, and an in-phase terminal of the second amplifier may be coupled to a seventh node. A first terminal of the seventh resistor may be coupled to the third voltage terminal, and a second terminal of the seventh resistor may be coupled to the eighth node. A first terminal of the eighth resistor may be coupled to the eighth node, and a second terminal of the eighth resistor may be coupled to the first voltage terminal. A first terminal of the first capacitor may be coupled to the fifth node, and a second terminal of the first capacitor may be coupled to a first terminal of the ninth resistor. A second terminal of the ninth resistor may be coupled to the sixth node. A first terminal of the tenth resistor may be coupled to the sixth node, and a second terminal of the tenth resistor may be coupled to the third node. A first terminal of the eleventh resistor may be coupled to the seventh node, and a second terminal of the eleventh resistor may be coupled to the eighth node. A first terminal of the twelfth resistor may be coupled to the first voltage terminal, and a second terminal of the twelfth resistor may be coupled to the seventh node. The first isolation circuit may comprise a second diode. A first electrode of the second diode may be coupled to the fifth node, and a second electrode of the second diode may be coupled to the second node.

In an embodiment of the present disclosure, the first amplifying circuit may further comprise a thirteenth resistor, a second capacitor, and a third capacitor. The second amplifying circuit may further comprise a fourteenth resistor and a fourth capacitor. Further, the thirteenth resistor may be coupled between the first amplifier and the first node. A first terminal of the thirteenth resistor may be coupled to the in-phase terminal of the first amplifier, and a second terminal of the thirteenth resistor may be coupled to the first node. A first terminal of the second capacitor may be coupled to the in-phase terminal of the first amplifier, and a second terminal of the second capacitor may be coupled to the first voltage terminal. A first terminal of the third capacitor may be coupled to the fourth node, and a second terminal of the third capacitor may be coupled to the first voltage terminal. The fourteenth resistor may be coupled between the first capacitor and the fifth node. The first terminal of the first capacitor and the output terminal of the second amplifier may be coupled in parallel to a first terminal of the fourteenth resistor, and a second terminal of the fourteenth resistor may be coupled to the fifth node. A first terminal of the fourth capacitor may be coupled to the third voltage terminal, and a second terminal of the fourth capacitor may be coupled to the first voltage terminal.

In an embodiment of the present disclosure, the control circuit may further comprise a bypass circuit and an additional control circuit. Specifically, the bypass circuit may be coupled to the first node, the first voltage terminal, and a ninth node, and may be configured to bypass the sampling circuit according to a voltage signal of the ninth node. The additional control circuit may be coupled to the first voltage terminal, the second voltage terminal, the third voltage terminal, the second node, the ninth node, and the control signal terminal, and may be configured to generate an additional control signal according to a control signal from the control signal terminal, and provide the additional control signal to the second node and the ninth node, so that a current passing ability of the current adjustment circuit after the driving circuit is started is stronger than current passing ability during the start-up phase of the driving circuit, and the bypass circuit bypasses the sampling circuit.

In an embodiment of the present disclosure, the bypass circuit may comprise a second transistor. A control electrode of the second transistor may be coupled to the ninth node, a first electrode of the second transistor may be coupled to the first node, and a second electrode of the second transistor may be coupled to the first voltage terminal. The additional control circuit may comprise a sub-control circuit, a push-pull circuit, and a second isolation circuit. Specifically, the sub-control circuit may be coupled to the first voltage terminal, a control signal terminal, a tenth node, and a third voltage terminal, and may be configured to generate a sub-control signal according to the control signal from the control signal terminal and provide the sub-control signal to the tenth node. The push-pull circuit may be coupled to the second voltage terminal, a ninth node, the tenth node, and the first voltage terminal, and may be configured to generate the additional control signal according to the sub-control signal, and provide the additional control signal to the ninth node. The second isolation circuit may be coupled between the ninth node and the second node, and may be configured to provide the additional control signal to the second node, and prevent a voltage of the second node from being provided to the ninth node.

In an embodiment of the present disclosure, the sub-control circuit may comprise a photocoupler. Further, a first terminal of the photocoupler may be coupled to the first voltage terminal, a second terminal of the photocoupler may be coupled to the control signal terminal, a third terminal of the photocoupler may be coupled to the tenth node, and a fourth terminal of the photocoupler may be coupled to the third voltage terminal The push-pull circuit may comprise a third transistor and a fourth transistor. Further, a control electrode of the third transistor may be coupled to the tenth node, a first electrode of the third transistor may be coupled to the second voltage terminal, and a second electrode of the third transistor may be coupled to the ninth node. A control electrode of the fourth transistor may be coupled to the tenth node, a first electrode of the fourth transistor may be coupled to the first voltage terminal, and a second electrode of the fourth transistor may be coupled to the ninth node. The second isolation circuit may comprise a third diode. Further, a first electrode of the third diode may be coupled to the ninth node, and a second electrode of the third diode may be coupled to the second node.

In an embodiment of the present disclosure, the bypass circuit may further comprise a fourth diode and a fifteenth resistor. Further, a first electrode of the fourth diode and a first terminal of the fifteenth resistor may be coupled in parallel to the control electrode of the second transistor, and a second electrode of the fourth diode and a second terminal of the fifteenth resistor may be coupled in parallel to the first voltage terminal. The additional control circuit may further comprise a sixteenth resistor, a seventeenth resistor, an eighteenth resistor, and a nineteenth resistor. Specifically, the sixteenth resistor may be coupled between the photocoupler and the control signal terminal. A first terminal of the sixteenth resistor may be coupled to the second terminal of the photocoupler, and a second terminal of the sixteenth resistor may be coupled to the control signal terminal. The seventeenth resistor may be coupled between the photocoupler and the first voltage terminal. A first terminal of the seventeenth resistor may be coupled to the first voltage terminal, and a second terminal of the seventeenth resistor may be coupled to the first terminal of the photocoupler.

The eighteenth resistor and the nineteenth resistor may be coupled between the push-pull circuit and the bypass circuit. The second electrode of the third transistor and the second electrode of the fourth transistor may be coupled in parallel to a first terminal of the eighteenth resistor, and a first terminal of the nineteenth resistor and the first electrode of the third diode may be coupled in parallel to a second terminal of the eighteenth resistor. A second terminal of the nineteenth resistor may be coupled to the ninth node.

In an embodiment of the present disclosure, the first voltage terminal may be a common ground terminal.

A second aspect of the present disclosure provides a display panel. The display panel comprises an array substrate. The array substrate comprises a driving circuit and the drive control circuit according to the first aspect, wherein the drive control circuit is coupled between the driving circuit and a first voltage terminal and together forms a loop. The drive control circuit is configured to control a current in the loop, so that the current in the loop is within a predetermined range during the start-up phase of the driving circuit.

In an embodiment of the present disclosure, the driving circuit may be a data driving circuit.

In an embodiment of the present disclosure, the driving circuit may be a scan driving circuit.

A third aspect of the present disclosure provides a method for driving the drive control circuit according to the first aspect. The method comprises controlling the current in the loop according to the voltage signal difference between the voltage signal of the second node and the voltage signal of the first node, and controlling the voltage signal of the second node according to the voltage signal of the first node, so as to control the current in the loop during a start-up phase of the driving circuit.

In an embodiment of the present disclosure, the drive control circuit may be the drive control circuit according to the first aspect. The method may comprise generating, during the start-up phase of the driving circuit, a sampling voltage signal at the first node according to the current in the loop by the sampling circuit, amplifying the voltage signal of the first node by the amplifying circuit to generate an amplified voltage signal, and providing the amplified voltage signal to the second node, and controlling the current in the loop according to the voltage signal difference between the amplified voltage signal and the voltage signal of the first node by the current adjustment circuit.

In an embodiment of the present disclosure, the drive control circuit may be the drive control circuit according to the first aspect. The method may comprise: generating, after the driving circuit is started, the additional control signal according to the control signal from the control signal terminal by the additional control circuit, and providing the additional control signal to the second node and the ninth node, according to the additional control signal, a current passing ability of the current adjustment circuit after the driving circuit is started being stronger than that during a start-up phase of the driving circuit, and bypassing the sampling circuit according to the voltage signal of the ninth node by the bypass circuit.

BRIEF DESCRIPTION OF THE DRAWINGS

In order to illustrate the technical solutions of the embodiments of the present disclosure more clearly, drawings of the embodiments will be briefly described below. It should be appreciated that the drawings described below relate only to some embodiments of the present disclosure, rather than limiting the present disclosure. In the drawings.

DETAILED DESCRIPTION

In order to make the technical solutions and advantages of the present disclosure more clear, the technical solutions in the embodiments of the present disclosure will be clearly and completely described below in detail, in conjunction with the drawings. Obviously, the embodiments described are merely some but not all of the embodiments of the embodiments. Based on the described embodiments, all other embodiments obtained by those skills in the art without creative work also fall within the scope of protection scope for the present disclosure.

Unless otherwise defined, all technical and scientific terms used herein have the same meanings as commonly understood by those skills in the art to which the present disclosure belongs. In the present disclosure, the terms "first", "second", etc., are not intended to any one of the order of formation, a number, and a relative importance. Likewise, the terms such as "a(an)", "one", etc., are intended to mean the presence of at least one element rather than limiting the number. The terms "comprising", "including", "containing", etc., are intended that an element or article ahead of this term encompasses element(s) (or equivalent(s)) or article(s) (or equivalent(s)) listed behind this term, and does not exclude the other elements or articles. The terms such as "connecting", "coupling", etc. are not limited to a physical or mechanical connection, and additionally may also comprise electrical connection, it may refer to direct connection or connection via one or more intermediate medias.

In the display field, the size and resolution of display panels are increasing day by day, which potentially leads to larger capacitive loads in driving circuits such as data driving circuits and scanning driving circuits, so the start-up current of the driving circuit is greater. However, the greater start-up current may damage devices in the driving circuit, thereby reducing the lifetime of the display panel.

In view of the accuracy problem above, an embodiment of the present disclosure provides a drive control circuit, which may, during a start-up phase of the driving circuit, limit the start-up current in a predetermined range, realize the start-up with a limited current, avoid a damage to the devices caused by the greater start-up current, and thus avoid the lifetime of the display panel from being shortened. In addition, the drive control circuit provided by this embodiment may also avoid the start-up current from being too small, so that the driving circuit can start normally.

Embodiments of the present disclosure provide a drive control circuit and a driving method for the drive control circuit and a display panel. The embodiments and examples of the present disclosure will be described in detail below in conjunction with the drawings.

Figure 1:
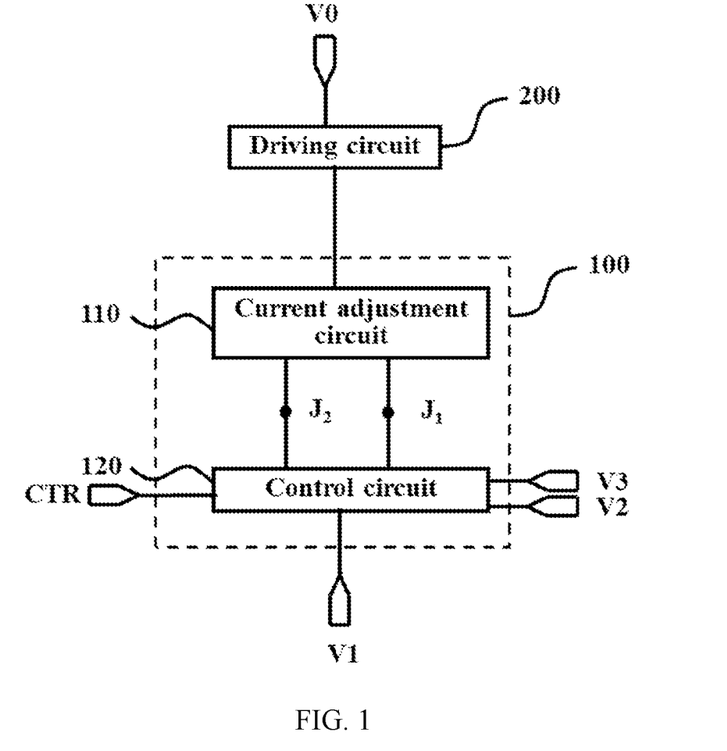
FIG. 1 shows a schematic block diagram of the drive control circuit according to an embodiment of the present disclosure.

FIG. 1 shows a schematic block diagram of a drive control circuit 100 according to an embodiment of the present disclosure. The drive control circuit 100 is connected in series between the driving circuit 200 and the first voltage terminal, and forms a loop together. In the embodiment, the first voltage terminal may be a ground terminal, and the first voltage signal V1 is 0V. The driving circuit 100 is connected in series between the driving voltage terminal and the first voltage terminal. It will be understood that, in the embodiments of the present disclosure, the loop refers to a loop composed of the driving voltage terminal, the first voltage terminal, as well as the driving circuit 200 and the control circuit 100 connected in series between the driving voltage terminal and the first voltage terminal. As shown in FIG. 1, the drive control circuit 100 may comprise a current adjustment circuit 110 and a control circuit 120. The current adjustment circuit 110 may be coupled to the driving circuit 200, the first node J1 and the second node J2. The current adjustment circuit 110 may control the current Ic in the loop according to a voltage signal difference VGS between a voltage signal VJ2 of the second node and a voltage signal VJ1 of the first node.

The control circuit 120 may be coupled to the second node J2, the first voltage terminal, the second voltage terminal, the third voltage terminal, the control signal terminal and the first node J1. The control circuit 120 may control the voltage signal VJ2 of the second node according to the voltage signal VJ1 of the first node, so that the current adjustment circuit 110 may limit the current Ic in the loop to the predetermined range during the start-up phase of the driving circuit 200. In the embodiment of the present disclosure, the control circuit 120 is coupled to the second voltage terminal to receive the second voltage signal V2. The control circuit 120 is coupled to the third voltage terminal to receive the third voltage signal V3. In the embodiment, the second voltage signal V2 of the second voltage terminal is greater than the first voltage signal V1 of the first voltage terminal, for example, V2 may be 12V and V1 may be 5V. In some embodiments, the predetermined range may not exceed a normal operating current of the driving circuit 200. In other embodiments, the predetermined range may also be a current range containing the normal operating current. It will be described in detail below in conjunction with FIGS. 2 to 4.

Figure 2:
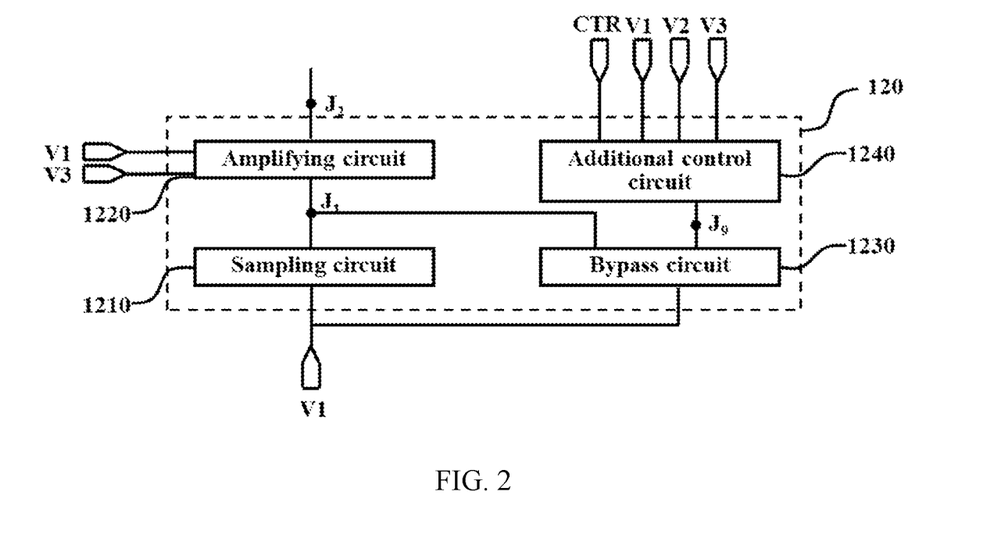
FIG. 2 shows a schematic block diagram of a control circuit according to an embodiment of the present disclosure.

FIG. 2 shows a schematic block diagram of a control circuit 120 according to an embodiment of the present disclosure. The control circuit 120 may comprise a sampling circuit 1210 and an amplifying circuit 1220, a bypass circuit 1230, and an additional control circuit 1240.

As shown in FIG. 2, the sampling circuit 1210 is coupled between the first node J1 and the first voltage terminal. The sampling circuit 1210 may generate a sampling voltage signal VJ1 at the first node J1 according to the current Ic in the loop. The amplifying circuit 1220 may be coupled to the first node J1, the first voltage terminal, the third voltage terminal, and the second node J2. The amplifying circuit 1220 may amplify the voltage signal VJ1 of the first node to generate an amplified voltage signal, and provide the amplified voltage signal to the second node J2.

Figure 3:
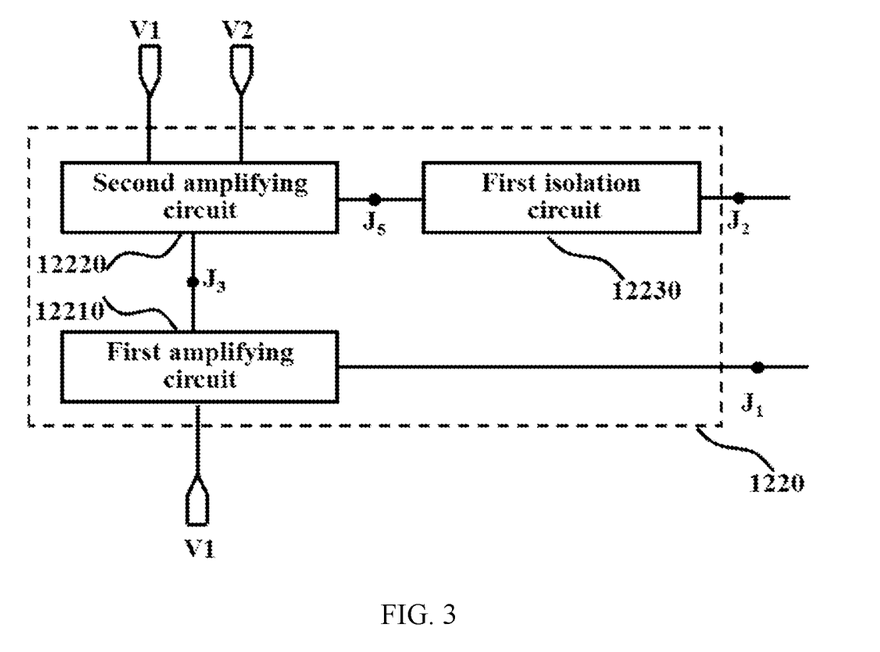
FIG. 3 shows a schematic block diagram of an amplifying circuit according to an embodiment of the present disclosure.

Specifically, FIG. 3 shows a schematic block diagram of an amplifying circuit 1220 according to an embodiment of the present disclosure. As shown, the amplifying circuit 1220 may comprise a first amplifying circuit 12210, a second amplifying circuit 12220, and a first isolation circuit 12230. The first amplifying circuit 12210 may be coupled to the first node J1, the first voltage terminal, and the third node J3. The first amplifying circuit 12210 may amplify the voltage signal VJ1 of the first node to generate a first amplified voltage signal VF1, and then provide the first amplified voltage signal VF1 to the third node J3. VF1 and VJ1 have a positive proportion relationship. In the embodiment, the first amplifying circuit 12210 may be a differential amplifying circuit, so that the first amplified voltage signal VF1 is equivalent to the third voltage signal V3, for example, the difference is less than or equal to one order of magnitude. The second amplifying circuit 12220 may be coupled to the first voltage terminal, the third voltage terminal, the fifth node J5, and the second node J2. The second amplifying circuit 12220 may amplify the first amplified voltage signal VF1 into the second amplified voltage signal VF2, and provide the second amplified voltage signal VF2 as the amplified voltage to the fifth node J5. VF2 and VF1 have a negative proportion relationship. In this embodiment, the second amplifying circuit 12220 may be an integral amplifying circuit, so as to avoid the second amplified voltage signal VF2 from jumping. The first isolation circuit 12230 may be coupled between the fifth node J5 and the second node J2. The first isolation circuit 12230 may provide the second amplified voltage signal VF2 to the second node J2, and prevent the voltage signal VJ2 of the second node from being provided to the fifth node J5.

As shown in FIG. 2, the bypass circuit 1230 may be coupled to the first node J1, the first voltage terminal, and the ninth node J9. The bypass circuit 1230 may bypass the sampling circuit 1210 according to the voltage signal VJ9 of the ninth node.

Figure 4:
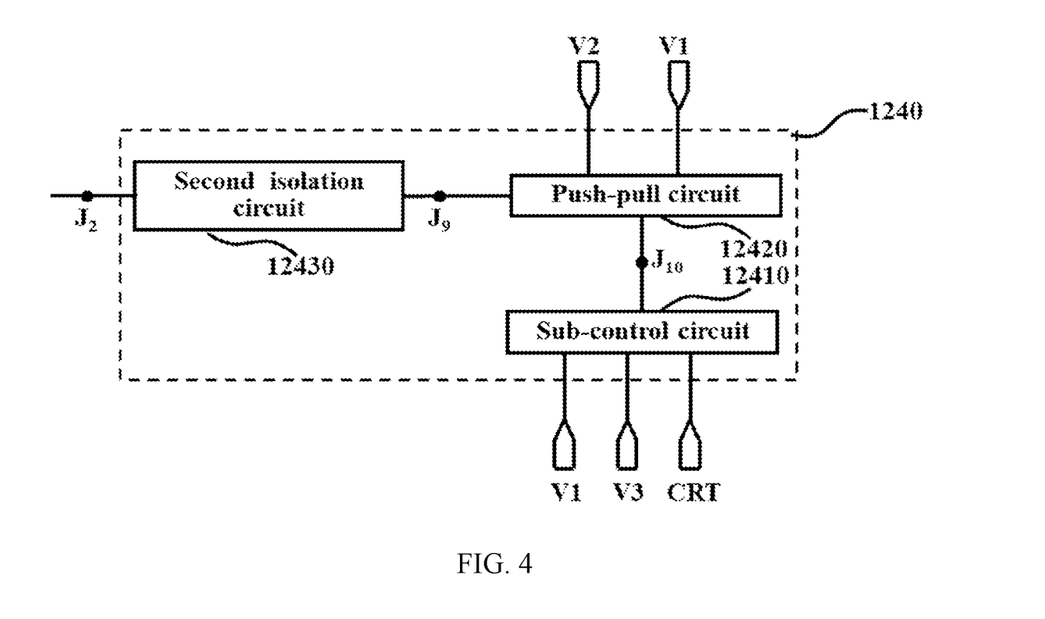
FIG. 4 shows a schematic block diagram of an additional control circuit according to an embodiment of the present disclosure.

As shown in FIG. 2, the additional control circuit 1240 may be coupled to the first voltage terminal, the second voltage terminal, the third voltage terminal, the second node J2, the ninth node J9, and the control signal terminal. The additional control circuit 1240 may generate an additional control signal CTRad according to the control signal CTR from the control signal terminal, and provide the additional control signal CTRad to the second node J2 and the ninth node J9, so that current passing ability of the current adjustment circuit 110 after the driving circuit 200 is started is stronger than the current passing ability during the start-up phase of the driving circuit 200, and that the bypass circuit 1230 bypasses the sampling circuit 1210 after the driving circuit 200 is started. Further, the additional control circuit 1240 may comprise a sub-control circuit 12410, a push-pull circuit 12420, and a second isolation circuit 12430. The sub-control circuit 12410 may be coupled to the first voltage terminal, the control signal terminal, the tenth node J10 and the third voltage terminal. The sub-control circuit 12410 may generate a sub-control signal CTRsub according to the control signal CTR from the control signal terminal, and provide the sub-control signal CTRsub to the tenth node J10. In this embodiment, when the driving circuit 200 enters a normal operating state after being started, the control signal CTR is provided by an external device (not shown). The push-pull circuit 12420 may be coupled to the second voltage terminal, the ninth node J9, the tenth node J10, and the first voltage terminal. The push-pull circuit 12420 may generate the additional control signal CTRad according to the sub-control signal CTRsub, and provide the additional control signal CTRad to the ninth node J9. The second isolation circuit 12430 is coupled between the ninth node J9 and the second node J2. Similar to the function of the first isolation circuit 12230, the second isolation circuit 12430 may provide the additional control signal CTRad to the second node J2, and prevent the voltage signal VJ2 of the second node from being provided to the ninth node J9.

Figure 5:
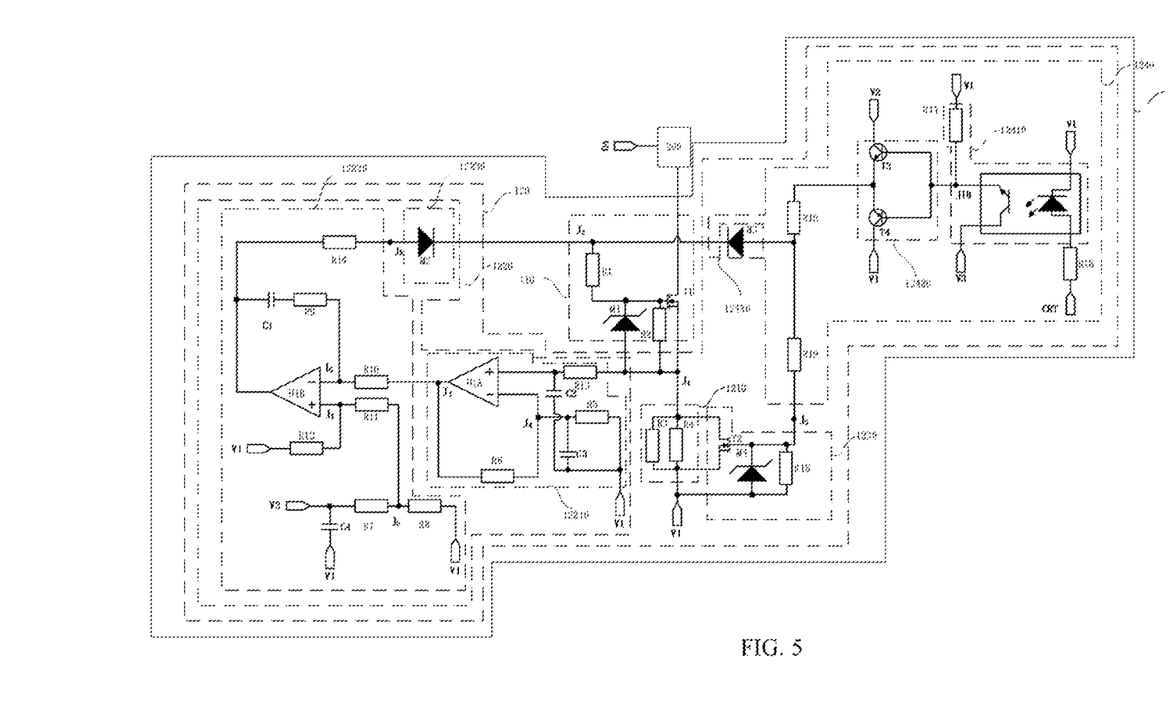
FIG. 5 shows an exemplary circuit diagram of the drive control circuit according to an embodiment of the present disclosure.

The drive control circuit provided by the embodiment of the present disclosure will be described below with an exemplary circuit structure. FIG. 5 shows an exemplary circuit diagram of a drive control circuit 300 according to an embodiment of the present disclosure. As shown in FIG. 5, the drive control circuit 300 may comprise a first transistor T1 to a fourth transistor T4, a first capacitor C1 to a fourth capacitor C4, a first diode M1, a second diode M2, a third diode M3, and a first resistor R1 to a nineteenth resistor R19.

It will be noted that all the transistors used in the embodiments of the present disclosure may be a thin film transistor, a field effect transistor, or other switching devices with the same characteristics. In the embodiments of the present disclosure, the thin film transistor is taken as an example for description. Due to source and drain electrodes of the transistor used herein may be symmetrical in structure, there will be no difference between the source and drain electrodes. In the embodiments of the present disclosure, a gate electrode of the transistor is referred to as the control electrode, and the two electrodes other than the gate electrode are referred to as the first electrode and the second electrode, respectively. In addition, the transistors can be classified into N-type and P-type transistors according to their characteristics.

As shown in FIG. 5, the current adjustment circuit 110 may comprise a first transistor T1. The control electrode of the first transistor T1 may be coupled to the second node J2. The first electrode of the first transistor T1 may be coupled to the driving circuit 200, and the second electrode of the first transistor T1 may be coupled to the first node J1. In the embodiment, the first transistor T1 may be N-type, such as an N-type MOS transistor. In other embodiments, the first transistor T1 may be P-type. In the embodiment, the current Ic in the main loop flows out from the second electrode of the first transistor T1. The current Ic is controlled by controlling the voltage signal difference VGS between the control electrode and the second electrode of the first transistor T1. Specifically, Vth represents a threshold voltage of the first transistor T1, and VDS represents the voltage signal difference between the first electrode and second electrode of the first transistor T1. When the first transistor T1 is in a variable resistance region, Ic may be calculated by the following equation:

$$I_c = K_1((V_{GS} - V_{th}) \cdot V_{DS} - V_{DS}^2/2) \quad \text{Equation (1)}$$

where $K_1$ represents a coefficient.

When the first transistor T1 is in a constant current region, Ic may be calculated by the following equation:

$$I_c = K_2(V_{GS} - V_{th})^2, \quad \text{Equation (2)}$$

where $K_2$ represents a coefficient.

In the embodiment, due to the load of the driving circuit 200 is much greater than the load of the drive control circuit 300, it can be considered that VDS is constant during the start-up phase of the driving circuit 200, and VDS is constant after the driving circuit 200 is started. From Equation (1), it can be concluded that Ic has a positive proportion relationship with VGS. From Equation (2), it can be concluded that Ic has a positive proportion relationship with the square of VGS. Therefore, when the first transistor T1 is in both the variable resistance region and the constant current region, Ic and VGS may have a positive proportion relationship. In the embodiment, due to the voltage signal VJ1 of the first node is much smaller than the voltage signal VJ2 of the second node, when VJ2 is great, VGS and Ic are also great; when VJ2 is small, VGS and Ic are also small. In other words, the current passing ability of the first transistor T1 increases as VGS increases. Specifically, when VJ2 is great, VGS is also great, and the current passing ability of the first transistor T1 is great; when VJ2 is small, VGS is also small, and current passing ability of the first transistor T1 is small.

Additionally, the current adjustment circuit 110 may further comprise a first resistor R1, a first diode M1, and a second resistor R2. The first resistor R1 may be coupled between the second node J2 and the first transistor T1. Specifically, the first terminal of the first resistor R1 is coupled to the second node J2, and the second terminal of the first resistor R1 is coupled to the control electrode of the first transistor T1. In other words, the first resistor R1 is connected in series between the first node J1 and the control electrode of the first transistor T1, thereby limiting a current flowing to the control electrode of the first transistor T1. The first terminal of the first diode M1 and the first terminal of the second resistor R2 may be coupled in parallel to the control electrode of the first transistor T1, and the second electrode of the first diode M1 and the second terminal of the second resistor R2 are coupled in parallel to the first node J1. In this embodiment, the first diode M1 and the second resistor R2 may stabilize the voltage signal provided to the control electrode of the first transistor T1 according to the voltage signal VJ1 of the first node, preventing the VGS of the first transistor T1 from being excessively great, thereby protecting the first transistor T1.

As shown in FIG. 5, the control circuit 120 may comprise the sampling circuit 1210 and the amplifying circuit 1220. The sampling circuit 1210 may comprise the third resistor R3 and the fourth resistor R4. Specifically, the first terminal of the third resistor R3 and the first terminal of the fourth resistor R4 are coupled in parallel to the first node J1, and the second terminal of the third resistor R3 and the second terminal of the fourth resistor R4 are coupled in parallel to the first voltage terminal, so that the voltage signal VJ1 of the first node can be determined according to the current Ic in the loop. In this embodiment, R3 represents the resistance value of the third resistor R3, and R4 represents the resistance value of the fourth resistor R4, then the voltage signal VJ1 of the first node can be calculated by the following equation:

$$VJ_1 = R_3 R_4 / (R_3 + R_4) \cdot I_c. \quad \text{Equation (3)}$$

Therefore, according to Equation (3), it can be concluded that VJ1 has a positive proportion relationship with Ic.

The amplifying circuit 1220 may further comprise a first amplifying circuit 12210, a second amplifying circuit 12220, and a first isolation circuit 12230. The first amplifying circuit 12210 may comprise a first amplifier U1, the fifth resistor R5, and the sixth resistor R6. Specifically, the output terminal of the first amplifier U1 may be coupled to the third node J3, an in-phase terminal of the first amplifier U1 may be coupled to the first node J1, and an out-phase terminal of the first amplifier U1 may be coupled to the fourth node J4. The first terminal of the fifth resistor R5 may be coupled to the fourth node J4, and the second terminal of the fifth resistor R5 may be coupled to the first voltage terminal. The first terminal of the sixth resistor R6 may be coupled to the third node J3, and the second terminal of the sixth resistor R6 may be coupled to the fourth node J4. R5 represents the resistance value of the fifth resistor R5, and R6 represents the resistance value of the sixth resistor R6, then the first amplified voltage signal VF1 at the third node J3 can be calculated by the following equation:

$$VF_1 = (1 + R_5/R_6) \cdot VJ_1. \quad \text{Equation (4)}$$

In an embodiment, the first amplifying circuit 12210 is used to amplify the voltage signal VJ1 of the first node to be equivalent to the third voltage signal V3, for example, the difference between the voltage signal VJ1 of the first node and the third voltage signal V3 is less than or equal to one order of magnitude. The second amplifying circuit 12220 may comprise a second amplifier U2, the seventh resistor R7, the eighth resistor R8, the ninth resistor R9, the tenth resistor R10, the eleventh resistor R11, the twelfth resistor R12, and a first capacitor C1. Specifically, the output terminal of the second amplifier U2 may be coupled to the fifth node J5, the out-phase terminal of the second amplifier U2 is coupled to the sixth node J6, and the in-phase terminal of the second amplifier U2 is coupled to the seventh node J7. The first terminal of the seventh resistor R7 may be coupled to the third voltage terminal, and the second terminal of the seventh resistor R7 may be coupled to the eighth node J8. The first terminal of the eighth resistor R8 may be coupled to the eighth node J8, and the second terminal of the eighth resistor R8 may be coupled to the first voltage terminal. In the embodiment, R7 represents the resistance value of the seventh resistor R7, and R8 represents the resistance value of the eighth resistor R8. The voltage signal VJ6 of the sixth node can be calculated by the following equation:

$$VJ_6 = R_8/(R_7+R_8) \cdot V3. \qquad \text{Equation (5)}$$

The first terminal of the first capacitor C 1 may be coupled to the fifth node J5, and the second terminal of the first capacitor C1 may be coupled to the first terminal of the ninth resistor R9. The second terminal of the ninth resistor R9 may be coupled to the sixth node J6. The first terminal of the tenth resistor R10 is coupled to the sixth node J6, and the second terminal of the tenth resistor R10 may be coupled to the third node J3. The first terminal of the eleventh resistor R11 may be coupled to the seventh node J7, and the second terminal of the eleventh resistor R11 may be coupled to the eighth node J8. The first terminal of the twelfth resistor R12 may be coupled to the first voltage terminal, and the second terminal of the twelfth resistor R12 may be coupled to the seventh node J7. In this embodiment, C1 represents the capacitance value of the first capacitor, R9 represents the resistance value of the ninth resistor R9, R10 represents the resistance value of the tenth resistor R10, R11 represents the resistance value of the eleventh resistance R11, R12 represents the resistance value of the twelfth resistance R12, and t represents time. In this embodiment, R10/R9=R11/R12, and the second amplified voltage signal VF2 at the fifth node J5 can be calculated by the following equation:

$$\begin{aligned} VF_2 &= (VJ_6 - VF_1) \cdot P \qquad \text{Equation (6)} \\ &= (VJ_6 - VF_1) \cdot (R_{10}/R_9)\left(1 - e^{(-t/(R9C1))}\right) \\ &= (VJ_6 - VF_1) \cdot (R_{11}/R_{12})\left(1 - e^{(-t/(R9C1))}\right). \end{aligned}$$

In combination with Equation (4) and Equation (5), the following equation can be obtained $$VF_2 = (R_8/(R_7+R_8) \cdot V3 - (1+R_5/R_6) \cdot VJ_1) \cdot (R_{10}/R_9)$$
$$(1 - e^{(-t/(R9C1))}). \qquad \text{Equation (7)}$$

Assuming that t is constant, according to Equation (7), it can be concluded that the second amplified voltage signal VF2 has a negative proportion relationship with the voltage signal VJ1 of the first node. Specifically, during the start-up phase of the driving circuit 200, when the voltage signal VJ1 of the first node is greater than a nominal value, the second amplified voltage signal VF2 becomes smaller. When the voltage signal VJ1 of the first node is smaller than a nominal value, the second amplified voltage signal VF2 becomes greater. As mentioned above, when the second amplified voltage signal VF2 is greater than a nominal value, VGS becomes greater, the current passing ability of the first transistor T1 becomes greater, and Ic also becomes greater. When the second amplified voltage signal VF2 is smaller than a nominal value, VGS becomes smaller, the current passing ability of the first transistor T1 becomes smaller, and Ic also becomes smaller. Therefore, during the start-up phase of the driving circuit 200, Ic may be limited in the predetermined range to avoid damage to the device caused by a great Ic, thereby avoiding shortening the lifetime of the display panel, and this can prevent Ic from being excessively small, so that the driving circuit 200 may be started normally.

The first isolation circuit 12230 may comprise a second diode M2. The first electrode of the second diode M2 may be coupled to the fifth node J5, and the second electrode of the second diode M2 may be coupled to the second node J2. In this embodiment, according to a characteristic of unidirectional conduction of the second diode M2, the second amplified voltage signal VF2 of the fifth node J5 may be provided to the second node J2, and the voltage signal VJ2 of the second node cannot be reversely provided to the fifth node J5. Specifically, during the start-up phase of the driving circuit 200, the second amplified voltage signal VF2 of the fifth node J5 may be provided to the second node J2.

Additionally, the first amplifying circuit 12210 may further comprise the thirteenth resistor R13, the second capacitor C2 and the third capacitor C3. The thirteenth resistor R13 may be coupled between the first amplifier U1 and the first node J1. Specifically, the first terminal of the thirteenth resistor R13 may be coupled to the in-phase terminal of the first amplifier U1, and the second terminal of the thirteenth resistor R13 may be coupled to the first node J1. The first terminal of the second capacitor C2 may be coupled to the in-phase terminal of the first amplifier U1, and the second terminal of the second capacitor C2 may be coupled to the first voltage terminal. The first terminal of the third capacitor C3 may be coupled to the fourth node J4, and the second terminal of the third capacitor C3 may be coupled to the first voltage terminal. The second amplifying circuit 12220 may further comprise the fourth capacitor C4 and the fourteenth resistor R14. Specifically, the first terminal of the fourth capacitor C4 may be coupled to the third voltage terminal, and the second terminal of the fourth capacitor C4 may be coupled to the first voltage terminal. The fourteenth resistor R14 is coupled between the first capacitor C1 and the fifth node J5. Further, the first terminal of the first capacitor C1 and the output terminal of the second amplifier U2 are coupled in parallel to the first terminal of the fourteenth resistor R14, and the second terminal of the fourteenth resistor R14 may be coupled to the fifth node J5. In the embodiment, the thirteenth resistor R13 and the fourteenth resistor R14 may be used for current limiting. The second capacitor C2, the third capacitor C3, and the fourth capacitor C4 may be used to suppress noise in the circuit, thereby preventing the noise from affecting the circuit.

As shown in FIG. 5, the control circuit 120 may further comprise the bypass circuit 1230 and the additional control circuit 1240. Specifically, the bypass circuit 1230 may comprise a second transistor T2. Further, the control electrode of the second transistor T2 may be coupled to the ninth node J9, the first electrode of the second transistor T2 may be coupled to the first node J1, and the second electrode of the second transistor T2 may be coupled to the first voltage terminal. In the embodiment, after the driving circuit 200 is started, the voltage signal VJ9 of the ninth node is provided to the control electrode of the second transistor T2, and the second transistor T2 is turned on, thereby bypassing the sampling circuit 1210, so that power consumption of the drive control circuit 300 may be reduced. In addition, due to the first voltage terminal is a ground terminal, the voltage signal VJ1 of the first node is close to 0V.

The additional control circuit 1240 may comprise the sub-control circuit 12410, the push-pull circuit 12420 and the second isolation circuit 12430. The sub-control circuit 12410 comprises a photocoupler OC. Specifically, the first terminal of the photocoupler OC may be coupled to the first voltage terminal, the second terminal of the photocoupler OC may be coupled to the control signal terminal, the third terminal of the photocoupler OC may be coupled to the tenth node J10, and the fourth terminal of the photocoupler OC may be coupled to the third voltage terminal. In the embodiment, after the driving circuit 200 is started, the control signal terminal provides the control signal CTR in a high-level, and the photocoupler OC provides signal in a high-level to the push-pull circuit 12420.

The push-pull circuit 12420 comprises the third transistor T3 and the fourth transistor T4. Further, the control electrode of the third transistor T3 may be coupled to the tenth node J10, the first electrode of the third transistor T3 may be coupled to the second voltage terminal, and the second electrode of the third transistor T3 may be coupled to the ninth node J9. The control electrode of the fourth transistor T4 may be coupled to the tenth node J10, the first electrode of the fourth transistor T4 may be coupled to the first voltage terminal, and the second electrode of the fourth transistor T4 may be coupled to the ninth node J9. In the embodiment, the third transistor T3 and the fourth transistor T4 are of different types. For example, the third transistor T3 is N-type and the fourth transistor T4 is P-type. Alternatively, in other embodiments, the third transistor T3 may be P-type and the fourth transistor T4 may be N-type. In the embodiment, after the driving circuit 200 is started, the control electrodes of the third transistor T3 and the fourth transistor T4 receive the signal in a high-level provided by the photocoupler OC, the third transistor T3 is turned on, and the fourth transistor T4 is turned off. The third transistor T3 provides the second voltage signal V2 from the second voltage terminal to the second node J2. As mentioned above, after the driving circuit 200 is started, the voltage signal VJ1 of the first node is close to 0V, so VGS of the first transistor T1 is close to 12V at the maximum, so that the current passing ability of the first transistor T1 is stronger than that during the start-up phase of the driving circuit 200.

The second isolation circuit 12430 may comprise a third diode M3. The first electrode of the third diode M3 may be coupled to the ninth node J9, and the second electrode of the third diode M3 may be coupled to the second node J2. In the embodiment, after the driving circuit 200 is started, the third transistor T3 provides the second voltage signal V2 from the second voltage terminal to the second node J2 via the third diode M3, and the voltage signal of the second node cannot pass through the third diode M3 reversely. In the embodiment, during the start-up phase of the driving circuit 200, the control signal terminal provides the control signal CTR in a low-level. The photocoupler OC provides a signal in a low-level to the push-pull circuit 12420. The fourth transistor T4 is turned on, and the push-pull circuit 12420 outputs the first voltage signal V1 (low-level). As mentioned above, during the start-up phase of the driving circuit 200, the voltage signal VJ5 of the fifth node is greater than V1, that is, VJ5>V1; therefore, the second diode M2 is turned on, the third diode M3 is turned off, and the voltage signal VJ2 of the second node is equal to the voltage signal VJ5 of the fifth node, VJ2=VJ5. Similarly, after the driving circuit 200 is started, the third transistor T3 is turned on, and the push-pull circuit 12420 outputs the second voltage signal V2 (12V), V2>VJ5; therefore, the second diode M2 is turned off, the third diode M3 is turned on, and the voltage signal VJ2 of the second node is equal to V2 that is, VJ2=V2.

Additionally, the bypass circuit 1230 may further comprise the fourth diode M4 and the fifteenth resistor R15. Specifically, the first electrode of the fourth diode M4 and the first terminal of the fifteenth resistor R15 may be coupled in parallel to the control electrode of the second transistor T2, and the second electrode of the fourth diode M4 and the second terminal of the fifteenth resistor R15 may be coupled in parallel to the first voltage terminal. In the embodiment, similar to the function of the first diode M1 and the second resistor R2, the fourth diode M4 and the fifteenth resistor R15 may stabilize the voltage provided to the control electrode of the second transistor T2, thereby preventing the VGS of the second transistor T2 from being excessively great, thereby protecting the second transistor T2. The additional control circuit 1240 may further comprise the sixteenth resistor R16, the seventeenth resistor R17, the eighteenth resistor R18 and the nineteenth resistor R19. Specifically, the sixteenth resistor R16 is coupled between the photocoupler OC and the control signal terminal. Further, the first terminal of the sixteenth resistor R16 is coupled to the second terminal of the photocoupler OC, and the second terminal of the sixteenth resistor R16 may be coupled to the control signal terminal. The seventeenth resistor R17 may be coupled between the photocoupler OC and the first voltage terminal. Further, the first terminal of the seventeenth resistor R17 may be coupled to the first voltage terminal, and the second terminal of the seventeenth resistor R17 may be coupled to the first terminal of the photocoupler OC. The eighteenth resistor R18 and the nineteenth resistor R19 may be coupled between the push-pull circuit 12420 and the bypass circuit 1230. The second electrode of the third transistor T3 and the second electrode of the fourth transistor T4 may be coupled in parallel to the first electrode of the eighteenth resistor R18, and the first terminal of the nineteenth resistor R19 and the first electrode of the third diode M3 are coupled in parallel to the second terminal of the eighteenth resistor R18. The second terminal of the nineteenth resistor R19 may be coupled to the ninth node J9. In the embodiment, the sixteenth resistor R16, the seventeenth resistor R17, the eighteenth resistor R18 and the nineteenth resistor R19 are all used for current limiting.

Figure 6:
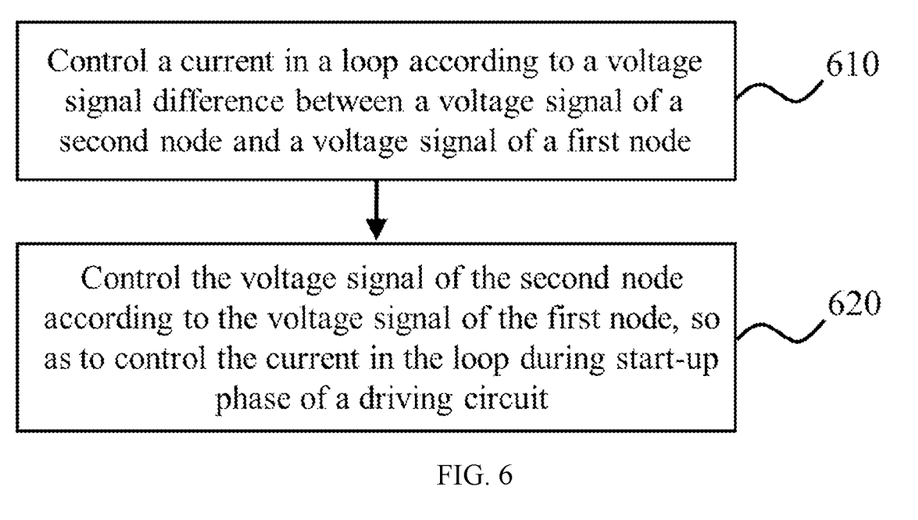
FIG. 6 shows a schematic flowchart of a method for driving the drive control circuit according to an embodiment of the present disclosure.

In addition, the embodiments of the present disclosure further provide a method for driving the drive control circuit. FIG. 6 shows a schematic flowchart of a method for driving the drive control circuit according to an embodiment of the present disclosure. The drive control circuit may be any applicable drive control circuit according to the embodiments of the present disclosure.

At step 610, the current Ic in the loop is controlled according to the voltage signal difference VGS between the voltage signal VJ2 of the second node and the voltage signal VJ1 of the first node. The current adjustment circuit 110 may control the current Ic in the loop according to the voltage signal difference VGS between the voltage signal VJ2 of the second node and the voltage signal VJ1 of the first node. Specifically, during the start-up phase of the driving circuit 200, the current Ic in the loop may be controlled based on the voltage signal difference VGS between the voltage signal VF2 of the control electrode of the first transistor T1 and the voltage signal VJ1 of the second electrode so that Ic is within the range. As shown in Equation (1) and Equation (2), Ic has a positive proportion relationship with VGS.

At step 620, the voltage signal VJ2 of the second node is controlled according to the voltage signal VJ1 of the first node, so as to control the current Ic in the loop during the start-up phase of the driving circuit 200. Specifically, the sampling circuit 1210 generates a voltage signal VJ1 at the first node J1 according to the current Ic in the loop, as shown in Equation (3). The amplifying circuit 1220 amplifies the voltage signal VJ1 of the first node, the amplified voltage signal is the second amplified voltage signal VF2, as shown in Equation (7), and the second amplified voltage signal VF2 is provided to the second node J2, so the voltage signal VJ2 of the second node is equal to VF2. Further, the first amplifying circuit 12210 amplifies the voltage signal VJ1 of the first node to generate a first amplified voltage signal VF1. As shown in Equation (4), VF1 and VJ1 have a positive proportion relationship. The second amplifying circuit 12220 amplifies the first amplified voltage signal VF1 to generate the second amplified voltage signal VF2. As shown in Equation (6), VF2 and VF1 have a negative proportion relationship. Therefore, as shown in Equation (7), VF2 and Ic have a negative proportion relationship. Specifically, during the start-up phase of the driving circuit 200, when Ic is greater than a nominal value, VF2 becomes smaller, VGS is reduced, and the current flowing out of the second electrode of the first transistor T1 is reduced, which means Ic is reduced. When Ic is smaller than the nominal value, VF2 becomes greater, VGS is increased, and the current flowing out of the second electrode of the first transistor T1 is increased, which means Ic is increased. After the driving circuit 200 is started, the additional control circuit 1240 generates the additional control signal CTRad according to the control signal CTR from the control signal terminal, and provides the additional control signal CTRad to the second node J2 and the ninth node J9. Then, according to the additional control signal CTRad, the current passing ability of the current adjusting circuit 110 after the driving circuit 200 is started is stronger than that during the start-up phase of the driving circuit, and the bypass circuit 1230 bypasses the sampling circuit 1210 according to the voltage signal VJ9 of the ninth node. In the embodiment, after the driving circuit 200 is started, the control signal CTR is in a high level, and the photocoupler OC provides the push-pull circuit 12420 with the sub-control signal CTRsub in a high level. The third transistor T3 is turned on, the fourth transistor T4 is turned off, and the second voltage signal V2 (12V) in a high-level is provided as the additional control signal CTRad to the second node J2 and the ninth node J9. The second transistor T2 is turned on, and the sampling circuit 1210 is bypassed. VGS of the first transistor T1 is the greatest, so it can be concluded from Equation (1) or Equation (2) that current passing ability of the first transistor T1 is stronger than that during the start-up phase of the driving circuit.

Those skilled in the art will appreciate that the above step are described in an order, which is not intended to limit to the order in which the method is performed, and the embodiments of the present disclosure may also be implemented in any other suitable order.

Figure 7:
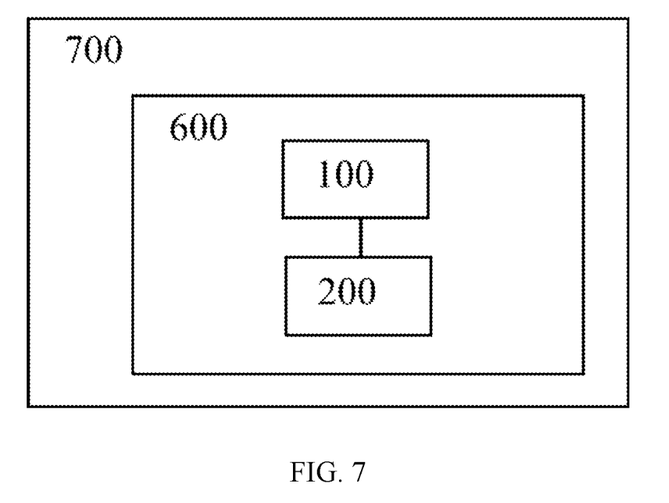
FIG. 7 is a schematic block diagram of a display panel according to an embodiment of the present disclosure.

In addition, an embodiment of the present disclosure further provides a display panel. FIG. 7 shows a schematic block diagram of the display panel 700 according to an embodiment of the present disclosure. In FIG. 7, the display panel 700 comprises an array substrate 600. Specifically, the array substrate 600 comprises the drive control circuit 100 (or 300) and the driving circuit 200 as described in the embodiments of the present disclosure. In some embodiments of the present disclosure, the drive control circuit may be a data driving circuit. In other embodiments, the driving circuit may be a scan driving circuit. In the embodiments, the display panel may be a liquid crystal panel, a liquid crystal television, a display, an OLED panel, an OLED television, an electronic paper display device, a mobile phone, a tablet, a laptop, a digital photo frame, and a navigators, etc. with a display function. Several embodiments according to the present disclosure have been described in detail above, but the protection scope of the present disclosure is not limited thereto. Obviously, Obviously, various modifications, substitutions, or variations in form of the embodiments of the present disclosure may be made by those of ordinary skilled in the art without departing from the spirit and scope of the present disclosure. The protection scope of the present disclosure is defined by the appended claims.

The invention claimed is:

1. A drive control circuit connected in series between a driving circuit and a first voltage terminal and forming a loop together, the drive control circuit comprising a current adjustment circuit and a control circuit, wherein:
   the current adjustment circuit is coupled to the driving circuit, a first node, and a second node, and is configured to control a current in the loop according to a voltage signal difference between a voltage signal of the second node and a voltage signal of the first node; and
   the control circuit is coupled to the second node, the first voltage terminal, a second voltage terminal, a third voltage terminal, a control signal terminal, and the first node, and is configured to control the voltage signal of the second node according to the voltage signal of the first node, so that the current adjustment circuit controls the current in the loop during a start-up phase of the driving circuit
   wherein the current adjustment circuit comprises a first transistor, a control electrode of the first transistor being coupled to the second node, a first electrode of the first transistor being coupled to the driving circuit, and a second electrode of the first transistor being coupled to the first node;
   wherein the current adjustment circuit comprises a first resistor, a first diode, and a second resistor, wherein:
      the first resistor is coupled between the second node and the first transistor, wherein, a first terminal of the first resistor is coupled to the second node, and a second terminal of the first resistor is coupled to the control electrode of the first transistor; and
      a first electrode of the first diode and a first terminal of the second resistor are coupled in parallel to the control electrode of the first transistor, and a second electrode of the first diode and a second terminal of the second resistor are coupled in parallel to the first node.

2. The drive control circuit according to claim 1, wherein the control circuit comprises a sampling circuit and an amplifying circuit, wherein:
   the sampling circuit is coupled between the first node and the first voltage terminal, and is configured to generate a sampling voltage signal at the first node according to the current in the loop; and
   the amplifying circuit is coupled to the first node, the first voltage terminal, the third voltage terminal, and the second node, and is configured to amplify the voltage signal of the first node to generate an amplified voltage signal, and provide the amplified voltage signal to the second node.

3. The drive control circuit according to claim 2, wherein the sampling circuit comprises a third resistor and a fourth resistor, wherein,
a first terminal of the third resistor and a first terminal of the fourth resistor are coupled in parallel to the first node, and a second terminal of the third resistor and a second terminal of the fourth resistor are coupled in parallel to the first voltage terminal.

4. The drive control circuit according to claim 2, wherein the amplifying circuit further comprises a first amplifying circuit, a second amplifying circuit, and a first isolation circuit, wherein:
the first amplifying circuit is coupled to the first node, the first voltage terminal, and a third node, and is configured to amplify the voltage signal of the first node to generate a first amplified voltage signal, and provide the first amplified voltage signal to the third node;
the second amplifying circuit is coupled to the first voltage terminal, the third voltage terminal, the third node, and a fifth node, and is configured to amplify the first amplified voltage signal into the second amplified voltage signal, and provide the second amplified voltage signal to the fifth node; and
the first isolation circuit is coupled between the fifth node and the second node, and is configured to provide the second amplified voltage signal as the amplified voltage signal to the second node, and prevent the voltage signal of the second node from being provided to the fifth node.

5. The drive control circuit according to claim 4, wherein the first amplifying circuit is a differential amplifying circuit, and the second amplifying circuit is an integral amplifying circuit.

6. The drive control circuit according to claim 4, wherein,
the first amplifying circuit comprises a first amplifier, a fifth resistor, and a sixth resistor, wherein,
an output terminal of the first amplifier is coupled to the third node, an in-phase terminal of the first amplifier is coupled to the first node, and an out-phase terminal of the first amplifier is coupled to a fourth node,
a first terminal of the fifth resistor is coupled to the fourth node, and a second terminal of the fifth resistor is coupled to the first voltage terminal, and
a first terminal of the sixth resistor is coupled to the third node, and the second terminal of the sixth resistor is coupled to the fourth node; and
the second amplifying circuit comprises a second amplifier, a seventh resistor, an eighth resistor, a first capacitor, a ninth resistor, a tenth resistor, an eleventh resistor, and a twelfth resistor, wherein,
an output terminal of the second amplifier is coupled to the fifth node, an out-phase terminal of the second amplifier is coupled to a sixth node, and an in-phase terminal of the second amplifier is coupled to a seventh node;
a first terminal of the seventh resistor is coupled to the third voltage terminal, and a second terminal of the seventh resistor is coupled to the eighth node;
a first terminal of the eighth resistor is coupled to the eighth node, and a second terminal of the eighth resistor is coupled to the first voltage terminal;
a first terminal of the first capacitor is coupled to the fifth node, and a second terminal of the first capacitor is coupled to a first terminal of the ninth resistor;

a second terminal of the ninth resistor is coupled to the sixth node;
a first terminal of the tenth resistor is coupled to the sixth node, and a second terminal of the tenth resistor is coupled to the third node;
a first terminal of the eleventh resistor is coupled to the seventh node, and a second terminal of the eleventh resistor is coupled to the eighth node;
a first terminal of the twelfth resistor is coupled to the first voltage terminal, and a second terminal of the twelfth resistor is coupled to the seventh node; and
the first isolation circuit comprises a second diode, a first electrode of the second diode is coupled to the fifth node, and a second electrode of the second diode is coupled to the second node.

7. The drive control circuit according to claim 6, wherein,
the first amplifying circuit further comprises a thirteenth resistor, a second capacitor, and a third capacitor, wherein,
the thirteenth resistor is coupled between the first amplifier and the first node, wherein a first terminal of the thirteenth resistor is coupled to the in-phase terminal of the first amplifier, and a second terminal of the thirteenth resistor is coupled to the first node;
a first terminal of the second capacitor is coupled to the in-phase terminal of the first amplifier, and a second terminal of the second capacitor is coupled to the first voltage terminal;
a first terminal of the third capacitor is coupled to the fourth node, and a second terminal of the third capacitor is coupled to the first voltage terminal; and
the second amplifying circuit further comprises a fourteenth resistor and a fourth capacitor, wherein,
the fourteenth resistor is coupled between the first capacitor and the fifth node, wherein the first terminal of the first capacitor and the output terminal of the second amplifier are coupled in parallel to a first terminal of the fourteenth resistor, and a second terminal of the fourteenth resistor is coupled to the fifth node; and
a first terminal of the fourth capacitor is coupled to the third voltage terminal, and a second terminal of the fourth capacitor is coupled to the first voltage terminal.

8. The drive control circuit according to claim 1, wherein the control circuit further comprises a bypass circuit and an additional control circuit, wherein,
the bypass circuit is coupled to the first node, the first voltage terminal, and a ninth node, and is configured to bypass the sampling circuit according to a voltage signal of the ninth node; and
the additional control circuit is coupled to the first voltage terminal, the second voltage terminal, the third voltage terminal, the second node, the ninth node, and the control signal terminal, and is configured to generate an additional control signal according to a control signal from the control signal terminal, and provide the additional control signal to the second node and the ninth node, so that a current passing ability of the current adjustment circuit after the driving circuit is started is stronger than the current passing ability during the start-up phase of the driving circuit, and the bypass circuit bypasses the sampling circuit.

9. The drive control circuit according to claim 8, wherein, the bypass circuit comprises a second transistor, wherein a control electrode of the second transistor is coupled to the ninth node, a first electrode of the second transistor is coupled to the first node, and a second electrode of the second transistor is coupled to the first voltage terminal; and the additional control circuit comprises a sub-control circuit, a push-pull circuit and a second isolation circuit, wherein, the sub-control circuit is coupled to the first voltage terminal, a control signal terminal, a tenth node, and a third voltage terminal, and is configured to generate a sub-control signal according to the control signal from the control signal terminal and provide the sub-control signal to the tenth node;

the push-pull circuit is coupled to the second voltage terminal, a ninth node, the tenth node, and the first voltage terminal, and is configured to generate the additional control signal according to the sub-control signal, and provide the additional control signal to the ninth node; and the second isolation circuit is coupled between the ninth node and the second node, and is configured to provide the additional control signal to the second node, and prevent a voltage of the second node from being provided to the ninth node.

10. The drive control circuit according to claim 9, wherein, the sub-control circuit comprises a photocoupler, wherein, a first terminal of the photocoupler is coupled to the first voltage terminal, a second terminal of the photocoupler is coupled to the control signal terminal, a third terminal of the photocoupler is coupled to the tenth node, and a fourth terminal of the photocoupler is coupled to the third voltage terminal;

the push-pull circuit comprises a third transistor and a fourth transistor, wherein, a control electrode of the third transistor is coupled to the tenth node, a first electrode of the third transistor is coupled to the second voltage terminal, and a second electrode of the third transistor is coupled to the ninth node;

a control electrode of the fourth transistor is coupled to the tenth node, a first electrode of the fourth transistor is coupled to the first voltage terminal, and a second electrode of the fourth transistor is coupled to the ninth node; and the second isolation circuit comprises a third diode, wherein a first electrode of the third diode is coupled to the ninth node, and a second electrode of the third diode is coupled to the second node.

11. The drive control circuit according to claim 10, wherein, the bypass circuit further comprises a fourth diode and a fifteenth resistor, wherein a first electrode of the fourth diode and a first terminal of the fifteenth resistor are coupled in parallel to the control electrode of the second transistor, and a second electrode of the fourth diode and a second terminal of the fifteenth resistor are coupled in parallel to the first voltage terminal;

the additional control circuit further comprises a sixteenth resistor, a seventeenth resistor, an eighteenth resistor, and a nineteenth resistor, wherein, the sixteenth resistor is coupled between the photocoupler and the control signal terminal, wherein a first terminal of the sixteenth resistor is coupled to the second terminal of the photocoupler, and a second terminal of the sixteenth resistor is coupled to the control signal terminal;

the seventeenth resistor is coupled between the photocoupler and the first voltage terminal, wherein a first terminal of the seventeenth resistor is coupled to the first voltage terminal, and a second terminal of the seventeenth resistor is coupled to the first terminal of the photocoupler;

the eighteenth resistor and the nineteenth resistor are coupled between the push-pull circuit and the bypass circuit, wherein the second electrode of the third transistor and the second electrode of the fourth transistor are coupled in parallel to a first terminal of the eighteenth resistor, and a first terminal of the nineteenth resistor and the first electrode of the third diode are coupled in parallel to a second terminal of the eighteenth resistor; and a second terminal of the nineteenth resistor is coupled to the ninth node.

12. The drive control circuit according to claim 1, wherein the first voltage terminal is a common ground terminal.

13. A display panel, the display panel comprising an array substrate, the array substrate comprising a driving circuit and the drive control circuit according to claim 1, wherein the drive control circuit is coupled between the driving circuit and a first voltage terminal and together forms a loop, and the drive control circuit is configured to control a current in the loop.

14. The array substrate according to claim 13, wherein the driving circuit is a data driving circuit.

15. The array substrate according to claim 13, wherein the driving circuit is a scan driving circuit.

16. A method for driving the drive control circuit according to claim 1, comprising:

controlling the current in the loop according to the voltage signal difference between the voltage signal of the second node and the voltage signal of the first node; and controlling the voltage signal of the second node according to the voltage signal of the first node, so as to control the current in the loop during a start-up phase of the driving circuit.

17. The method according to claim 16, wherein the control circuit comprises a sampling circuit and an amplifying circuit, the sampling circuit is coupled between the first node and the first voltage terminal, and is configured to generate a sampling voltage signal at the first node according to the current in the loop, and the amplifying circuit is coupled to the first node, the first voltage terminal, the third voltage terminal, and the second node, and is configured to amplify the voltage signal of the first node to generate an amplified voltage signal, and provide the amplified voltage signal to the second node, the method comprising:

generating, during a start-up phase of the driving circuit, a sampling voltage signal at the first node according to the current in the loop by the sampling circuit;

amplifying the voltage signal of the first node by the amplifying circuit to generate an amplified voltage signal, and providing the amplified voltage signal to the second node; and controlling the current in the loop according to the voltage signal difference between the amplified voltage signal and the voltage signal of the first node by the current adjustment circuit.

18. The method according to claim 17, wherein the control circuit further comprises a bypass circuit and an additional control circuit, the bypass circuit is coupled to the first node, the first voltage terminal, and a ninth node, and is configured to bypass the sampling circuit according to a voltage signal of the ninth node, the additional control circuit is coupled to the first voltage terminal, the second voltage terminal, the third voltage terminal, the second node, the ninth node, and the control signal terminal, and is configured to generate an additional control signal according to a control signal from the control signal terminal, and provide the additional control signal to the second node and the ninth node, so that a current passing ability of the current adjustment circuit after the driving circuit is started is stronger than the current passing ability during the start-up phase of the driving circuit, and the bypass circuit bypasses the sampling circuit, the method comprising:

- generating, after the driving circuit is started, the additional control signal according to the control signal from the control signal terminal by the additional control circuit, and providing the additional control signal to the second node and the ninth node;
- according to the additional control signal, a current passing ability of the current adjustment circuit after the driving circuit is started being stronger than that during start-up phase of the driving circuit; and
- bypassing the sampling circuit according to the voltage signal of the ninth node by the bypass circuit.

* * * * *